United States Patent [19]

Shimizu

[11] 3,868,845

[45] Mar. 4, 1975

[54] APPARATUS FOR MEASURING A DIFFERENCE IN TIME INTERVALS OF A TIMEPIECE

[75] Inventor: Hiroshi Shimizu, Sayama, Japan

[73] Assignee: Citizen Watch Co., Ltd., Tokyo, Japan

[22] Filed: Jan. 10, 1972

[21] Appl. No.: 216,531

[30] Foreign Application Priority Data
Jan. 20, 1971 Japan.................................. 46-1228
Feb. 5, 1971 Japan.................................. 46-4286

[52] U.S. Cl............................. 73/6, 58/109, 81/6, 235/92 EV, 235/92 T, 324/181, 328/129
[51] Int. Cl.......................... G04d 7/12, G01r 29/02
[58] Field of Search.................. 73/6; 58/109; 81/6; 324/181; 328/44, 129; 235/92 EV, 92 T, 92 TF

[56] References Cited
UNITED STATES PATENTS
2,682,187  6/1954  Kirby......................................... 81/6

| | | |
|---|---|---|
| 3,272,971 | 9/1966 | Klinikowski..................... 235/92 EV |
| 3,370,456 | 2/1968 | Jucker ...................................... 73/6 |
| 3,395,566 | 8/1968 | Jucker ...................................... 73/6 |
| 3,500,022 | 3/1970 | Toscano ......................... 235/92 EV |
| 3,585,502 | 6/1971 | Barkley............................... 324/189 |
| 3,624,649 | 11/1971 | Ranieri....................... 235/92 EV X |
| 3,678,252 | 7/1972 | Payne.............................. 235/92 EV |

*Primary Examiner*—Richard C. Queisser
*Assistant Examiner*—Frederick Shoon
*Attorney, Agent, or Firm*—Pollock, Philpitt & Vande Sande

[57] ABSTRACT

Apparatus for measuring a difference in consecutive intermittently produced impulses and measuring an outbeat of a watch, particularly a watch having an adjustable stud and adjusting the stud in accordance with the result of the measurement.

2 Claims, 9 Drawing Figures

3,868,845

APPARATUS FOR MEASURING A DIFFERENCE IN TIME INTERVALS OF A TIMEPIECE

BACKGROUND OF THE INVENTION

The present invention relates to an apparatus for measuring a difference in time intervals comprising means for measuring a difference between one pulse interval and another, and means for measuring an out-beat of a watch, particularly a watch having an adjustable stud and adjusting the stud in accordance with the result of the measurement.

Hithertofore, a difference between two time intervals with are apart in time from each other has been obtained by measuring the time intervals separately using a counter and thereafter calculating the difference from the results of the measurements. When the time intervals are close in time with each other, they have been separately measured by using two counters. This conventional method has been very complicated in practice and difficult to employ in an automatic measurement.

This difficulty has been a cause of inefficiency in watch manufacturing in which frequent measurements and adjustments are required. Particularly, there have been many problems in complicated adjusting of the out-beat of a watch.

The word "out-beat" herein is defined as being an offset of a roller jewel center from a line connecting the center of a pallet jewel and that of a balance jewel when a hair spring is completely loosened to a zero stress condition.

Hithertofore, the out-beat has usually been measured as a distance between lines which appear on a beat type speed timing machine and in accordance with the result of the measurement, the adjustable stud or the hair spring collet itself is mannually adjusted so that the distance between the lines is reduced. However, this method is disadvantageous in that it is very difficult to measure an out-beat unless the rate of a watch is accurately adjusted. Further, since in a usual watch the rate substantially changes as the out-beat is adjusted, it is often required to repeat the adjusting operations of the rate and the out-beat. Moreover, the indication of the out-beat on a timing machine as a distance between lines depends on an amplitude of a balance with hair spring or balanced wheel with increased distance under a small amplitude. Therefore, there exists no linear relationship between a desired angle of adjustment (hereinafter referred to as an "offset angle") and the distance between lines on the timing machine.

SUMMARY OF THE INVENTION

In view of the above disadvantages of the prior art, the present invention provides an apparatus for measuring a difference in time intervals, said apparatus comprising means for measuring a difference between time intervals including a reversible counter which is so constructed that it can automatically measure a difference between one pulse interval and another of intermittently produced impulse series independently of the length of the intervals, and means for automatically adjusting an out-beat of a watch by measuring the out-beat of the watch independently of the rate and a amplitude of a balance wheel through a reversible counting of the difference in time intervals between signals produced by the watch and gradually moving an adjustable stud which is suitably offset in a predetermined direction to the opposite direction in accordance with the measurement.

DESCRIPTION OF THE PREFERRED EMBODIMENTS

The apparatus in accordance with the present invention will now be described.

Figure 1:
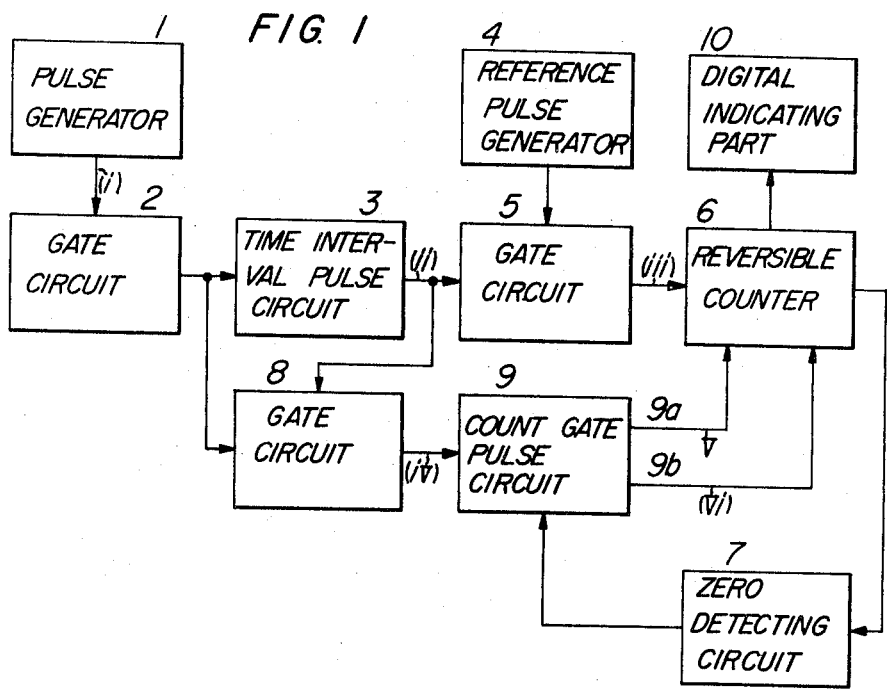
FIG. 1 is a block diagram showing one embodiment of the apparatus in accordance with the present invention.

Referring to FIG. 1, there is shown in a block diagram one embodiment of the digital apparatus for measuring the difference between time intervals. In the drawing, the reference numeral 1 shows a pulse generator for producing a series of impulses to be measured, 2 a gate circuit between the impulses series produced by the generator 1 and a measuring system, and 3 a circuit for producing two arbitrary time inteval pulses which are determined by the series of impulses passed through said gate 2. The reference numeral 4 designates a reference pulse generator, 5 a gate circuit which allows the reference pulses to pass therethrough during the period corresponding to the pulse interval produced in the circuit 3, 6 a reversible counter, 8 a gate circuit which allows the impulses from the pulse generating circuit 2 to pass therethrough during the period corresponding to the pulse interval produced in the circuit 3, 7 a zero-detecting circuit for producing a positive count gate pulse and a reverse count gate pulse for the reversible counter 6 by triggering with the impulse which has passed throgh the gate circuit 8 or with zero-pulse detected by the zero detecting circuit, and 10 a digital indicating part of the reversible counter 6.

Figure 2:
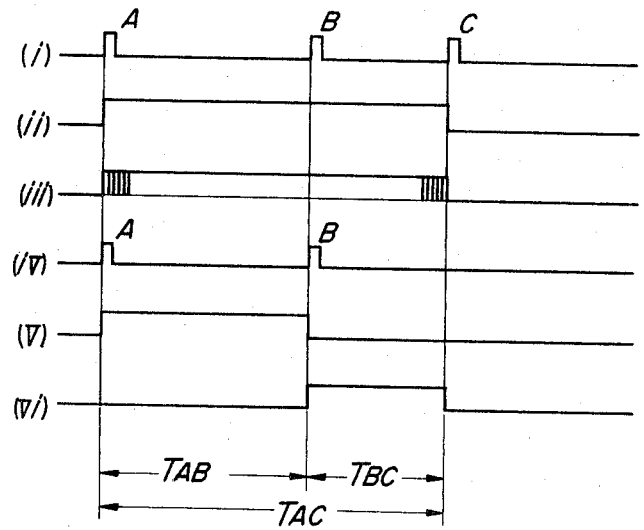
FIGS. 2 through 5 show wave patterns and operations in the apparatus shown in FIG. 1.

The operation of the apparatus will now be described. A series of impulses A, B, C . . . is produced by the impulse series generator 1 and introduced through the gate 2 into the measuring system. The impulses have wave forms as shown by a pattern I in FIG. 2. For the purpose of description, two time intervals $T_{AB}$ and $T_{BC}$ will be considered. When the time interval $T_{AB}$ is greater than $T_{BC}$, the pulse generating circuit 3 produces a pulse having a duration time $T_{AC}$ which is equal to the sum of the time intervals $T_{AB}$ and $T_{BC}$ as shown by the pattern II in FIG. 2. Only during this period $T_{AC}$, the reference pulses from the pulse generator 4 are allowed to pass through the gate 5 as measuring pulses or trigger inputs of the reversible counter 6. These pulses are shown by the pattern III in FIG. 2. On the other hand, the series of impulses which have passed through the gate 2 as shown by the pattern I in FIG. 2 are allowed to pass through the gate 8 only during the pulse interval $T_{AC}$ produced by the pulse generator 3 to form two pulses A and B as shown by the pattern IV in FIG. 2 so as to produce the positive and reverse count gate pulses at the circuit 9. Then, a positive count gate pulse 9a is produced as shown by the pattern V in FIG. 2. This pulse 9a is turned ON by the pulse A and turned OFF by the pulse B, and has a duration time $T_{AB}$. Simultaneously with the generation of the pulse B, a reverse count gate pulse 9b is produced as shown by the pattern VI in FIG. 2. This pulse 9b serves to stop the positive counting of the reversible counter 6 and start the reverse counting which is continued until the measuring pulse as shown by III in FIG. 2 is terminated.

Figure 3:
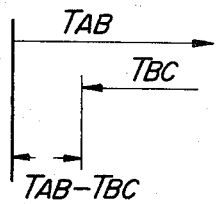

In this case, since the interval $T_{AB}$ is greater than $T_{BC}$ the indication of the reversible counter does not come to zero during the reverse counting, so that the counter indicates the difference between the time intervals $T_{AB}$ and $T_{BC}$, that is, $T_{AB} - T_{BC}$. This relationship is shown in FIG. 3.

When the time interval $T_{AB}$ is smaller than $T_{BC}$, the indication of the reversible counter 6 becomes zero during its reverse counting. This relationship is shown by FIG. 4.

Figure 4:
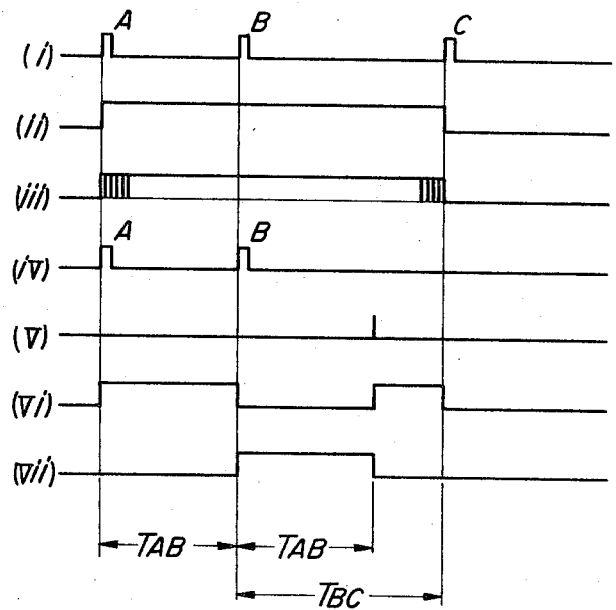

The reversible counter 6 initially performs a positive count in accordance with the positive count gate pulse 9a produced by the circuit 9 as shown by VI in FIG. 4 and thereafter performs a reverse count in accordance with the reverse count gate pulse 9b produced by the circuit 9 as shown by (VII) in FIG. 4. During the reverse count, the counter 6 indicates zero after the time $T_{AB}$ has passed from the state of the reverse count.

Figure 5:
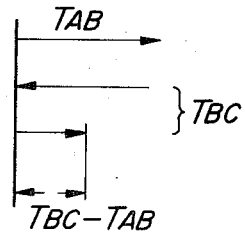

The zero pulse shown by V in FIG. 4 and produced by the zero detecting circuit 7 of the reversible counter triggers the positive and reverse count gate 9 to stop the reverse count gate pulse 9b shown by (VII) in FIG. 4 and to produce the positive count gate pulse 9a shown by VI in FIG. 4. Therefore, the counter again starts to perform the positive count until the measuring pulses terminate. When the count is completed, the counter indicates at its indicating part 10 a difference in time intervals, that is, $T_{BC} - T_{AB}$. This is shown in FIG. 5.

Thus, it is possible to indicate a difference in time intervals irrespective of inputs. There has thus been described apparatus for the measurement of two continuous time intervals, however, it is of course possible to measure a difference between two arbitrarily selected time intervals because the circuit 3 can be produce desired pulses arbitrarily for the measurement.

As described above, according to the present invention, it is possible to measure a difference between an arbitrary time interval and another arbitrary time interval irrespective of the time intervals in a series of pulses.

Figure 6:
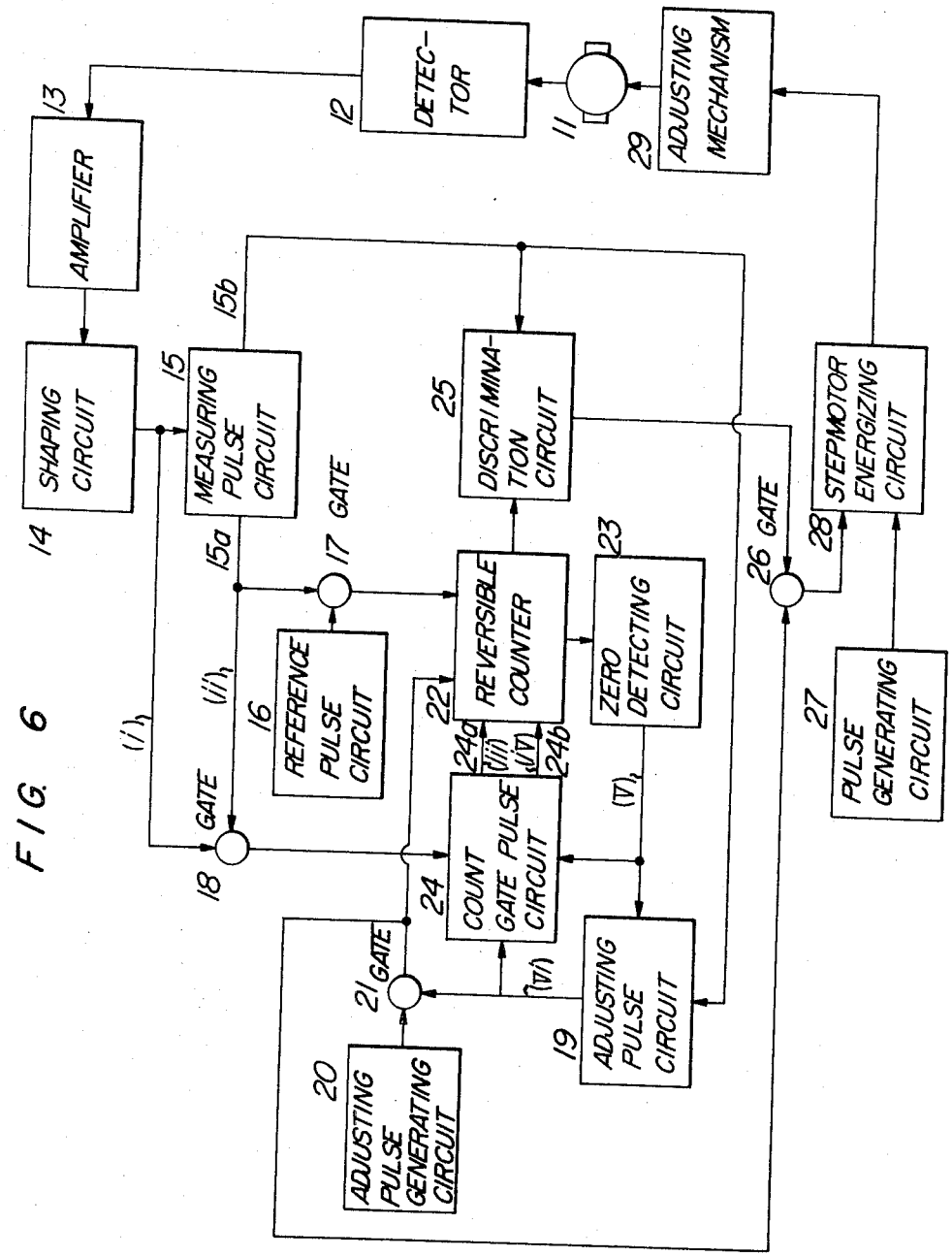
FIG. 6 is a block diagram showing one embodiment of the apparatus which includes an automatic out-beat adjusting means in accordance with the present invention.

Now, a reference will be made to a device for automatically adjusting an out-beat of a watch in accordance with the present invention. FIG. 6 shows a block diagram of the time interval measuring device including the automatic out-beat adjusting device in accordance with the present invention. In the drawing, the reference numeral 11 designates a watch to be adjusted, 12 a detector such as a microphone for detecting signals such as beats produced by the watch 11, 13 a circuit for amplifying the signals detected by the detector 12, 14 a circuit for shaping the waveforms of the signals amplified by the circuit 13, and 15 a circuit for producing a measuring pulse 15a and a terminating pulse 15b. The pulse 15a continues for a period required for the measurement of an out-beat and determined by the shaped signal. The reference numeral 16 designates a reference pulse generating circuit, 17 a gate allowing the reference pulses from the circuit 16 to pass therethrough only when the measuring pulse from the circuit 15 exists, 18 a gate for allowing the signal shaped in the circuit 14 to pass therethrough only when the pulse 15a from the circuit 15 exists, 19 a circuit for producing an adjusting pulse which indicates that an adjustment is being made by the terminating pulse 15b produced in the circuit 15, 20 an adjusting pulse generating circuit, 21 a gate for allowing the adjusting pulse from the circuit 20 to pass therethrough only when the pulse from the circuit 19 exists, 22 a reversible counter circuit, 23 a circuit for detecting the fact that the content in the reversible counter 22 is zero and producing a zero detecting pulse, and 24 a circuit controlled by the signal passed through the gate 18 during measurement and the zero detecting pulse from the circuit 23 for producing positive and reverse count gate pulses 24a and 24b for the reversible counter circuit 22 and for producing a reverse count gate pulse 24b by the pulse from the circuit 19 during adjusting operation, 25 a discrimination circuit which receives the terminating pulse from the circuit 15 as a timing pulse and determines whether the content in the reversible counte circuit 22 is acceptable or not, 26 a gate for allowing the adjusting pulse from the gate 21 only when an unacceptable pulse is produced by the discriminating circuit 25, 27 a pulse generating circuit, 28 a step motor energizing circuit, and 29 a mechanism mainly constituted by a step motor and adapted to displace an adjustable stud of the watch 11 to be adjusted.

Before proceeding with the description of the operation of the automatic out-beat adjusting device in accordance with the present invention, the out-beat will be described hereinafter. According to a general theory of watch design, it is known that the out-beat of a watch can be substantially represented by the following equation.

$$\Delta T = T/\pi\phi \; \epsilon \; ( = \delta/V )  \quad (a)$$

where: T represents a period of a balanced wheel, $\phi$ an amplitude of the balanced wheel, $\epsilon$ an offset angle which is to be adjusted, and $\Delta T$ an out-beat in terms of time which designates variations in intervals between signals from the watch. $\pi$ designates the circular constant. In the parenthesis, $\delta$ designates a distance between lines and V a scanning speed of a beat type timing machine. According to the automatic out-beat adjusting device of the present invention, the out-beat is measured from the difference between the intervals of the signals produced in a watch by counting the vaue $\Delta T$ in terms of pulses. However, as noted from the above equation, the value $\Delta T$ is a function of the amplitude of the balance wheel as in the case of the distance $\delta$ betwee lines in the beat type timing machine. In other words, even when the offset angle remains unchanged, the value $\Delta T$ increases as the amplitude $\phi$ of the balance wheel decreases. Therefore, it is impossible to represent the offset angle $\epsilon$ in a term that has a linear relationship thereto, so that highly skilled labour may be required to make the adjustment.

However, in the automatic out-beat adjusting device in accordance with the present invention, any effect of the amplitude $\phi$ of the balance wheel can be successfully eliminated by utilizing the fact that the positions of the adjustable stud are substantially distributed in a certain range (for example, ± 10° from a nominal design value).

Figure 7:
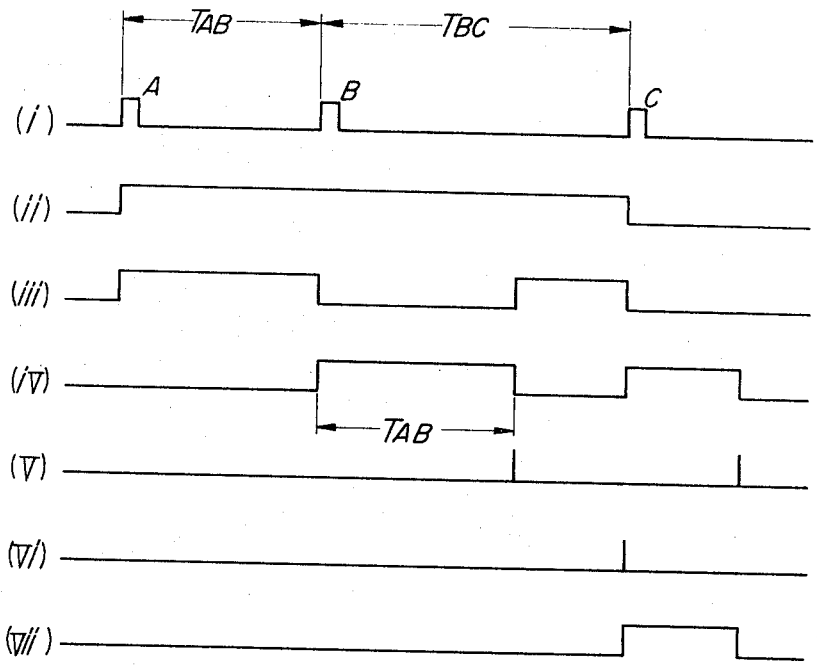
FIGS. 7 and 8 show wave patterns and operations in the apparatus shown in FIG. 6; and, FIG. 9 diagrammatically shows a manner of out-beat adjustment employed in the embodiment of FIG. 6.

The measuring and adjusting operation will now be described making reference to FIG. 6. Signals produced by a watch 11 that has an out-beat are detected by the detector 12 and amplified by the circuit 13. Thereafter, they are shaped in wave forms in the wave shaping circuit 14 as shown by the patterin I in FIG. 7. In FIG. 7 I, the rate represented as the time interval ($T_{AC} = T_{AB} + T_{BC}$) from the first signal pulse A to the third signal pulse C should not necessarily be precisely correct. The gate 17 allows the reference pulses from the circuit 16 to pass therethrough only during a period sufficient for measurement, that is, in this particular example, the period of the measuring pulse 15a shown in FIG. 7 II which is equal to the period from the first signal pulse A to the third pulse signal C produced by the circuit 15 in accordance with the wave form of FIG. 7 I. The gate 18 allows only pulses A and B to pass therethrough among the series of pulses shown in FIG. 7 I. The circuit 24 produces positive count gate pulses 24a as shown in FIG. 7 III and reverse count gate pulses as shown in FIG. 7 IV in accordance with the pulses A and B which have passed through the gate 18 and the zero detecting pulse (FIG. 7, V) which is produced by the circuit 23 for detecting the fact that the content in the reversible counter circuit 23 has become zero. The pulses from the circuit 24 are combined with the reference pulses from the gate 17 so as to control the reversible counter circuit 22.

Figure 8:
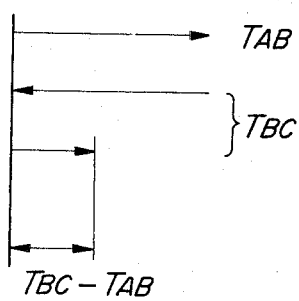

At first, the circuit 24 produces a positive count gate pulse in accordance with the signal pulse A so that the reversible counter circuit 22 starts to count from the zero condition. Then, as the second signal pulse B appears, the positive gate pulse from the circuit 24 is terminated and, at the same time, a reverse count gate pulse is produced. Thus, the reversible counter circuit 22 starts to perform a reverse count without being reset from the position at which the positive count is terminated. In the illustrated example, it is assumed that the time interval $T_{AB}$ between the first and second signal pulses A and B is smaller than that $T_{BC}$ between the second and third signal pulses B and C, so that the reversible counter circuit 22 again indicates zero when a time equal to $T_{AB}$ is passed after the reverse count is started. At this moment, the circuit 23 produces a zero detecting pulse, whereby the circuit 24 terminates the reverse count gate pulse and again produces a positive count gate pulse. Thus, the reversible counter 22 again starts to perform a positive count for a period equal to $T_{BC} - T_{AC}$. When the measuring pulse shown in FIG. 7, II is terminated, the counting is stopped. The operation of the reversible counter is shown in FIG. 8. In this instance, the measured value $T_{BC} - T_{AB}$ is equal to $2\Delta T$ because each time interval $T_{AB}$ or $T_{BC}$ includes the out-beat value $\Delta T$, so that the measured value is twice the out-beat value. However, this may be compensated for by reducing into one-half the frequency of the reference pulses generated by the circuit 16. In this example, it has been assumed that the first time interval $T_{AB}$ is smaller than the second time interval $T_{BC}$, however, when the former is greater than the latter, the operation will be much simpler so that its detailed description will be eliminated. It should also be noted that, although the example has been shown with respect to the minimum number of time intervals, it is of course possible to measure the out-beat by comparing the sum of odd numbered time intervals and the sum of even numbered time intervals.

A method for adjusting the content remaining in the reversible counter 22 as the result of measurement by taking it out in the form of output pulses will now be described. The adjusting interval pulse produced in the pulse generating circuit 19 in accordance with the measurement terminating pulse 15b from the circuit 15 as shown in FIG. 7, VI produces only a reverse count gate pulse 24b in the circuit 24 as shown in FIG. 6, IV and, at the same time, makes the adjusting pulse from the circuit 20 to pass through the gate 21. Thus, the reversible counter 22 starts to perform a reverse count. When the zero detecting pulse as shown in FIG. 7 V is produced by the zero detecting circuit 23, the adjusting interval pulse from the circuit 19 is terminated and the reverse counting is stopped. When the reversible counter 22 indicates that the timing of the measurement terminating pulse as shown in FIG. 7, VI from the circuit 15 is acceptable as the result of judgement in the discriminating circuit 25, the adjusting pulse from the gate 21 passes through the gate 26 and amplified in the step motor energizing circuit 28 to energize the step motor. The mechanism 29 which has a predetermined adjusting angle for one pulse and mainly constituted by the step motor serves to displace the adjustable stud so as to adjust to out-beat.

Next, a reference will be made to FIG. 9 in order to perform an adjustment without being affected by the amplitude of the balance wheel by making repeated incremental adjustment from the result of measurement which has an effect of the amplitude of the balance wheel.

Figure 9:
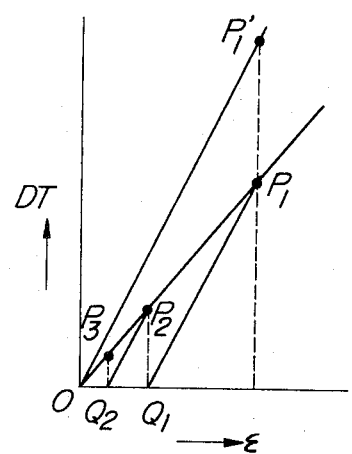

Referring to FIG. 9 which represents the aforementioned equation (a), description will be made with respect to a case in which the out-beat changes as shown by $P_1$ and $P_1'$ in response to a change in amplitude of the balance wheel while the offset angle is remaining constant. Assume that the mechanism 29 shown in FIG. 9 is adjusted so as to have a predetermined adjustment angle for one pulse in accordance with the slope of the smaller one of the amplitudes of the balance wheel. The out-beat $P_1$ which is the result of the measurement of large one of the amplitudes of the balance wheel is adjusted through a first cycle of adjustment to a value leaving an offset angle $Q_1$ and an out-bear $P_2$. A second measurement will indicate an out-bear $P_2$ and, as the result of a second adjustment, an offset angle $Q_2$ will be left. By thus repeating the measurement and adjustment, the out-beat can be incrementarily reduced with the result that the out-beat or the offset angle comes within the tolerance and is judged as being acceptable by the circuit 15.

In actual watch assemblies, where the amplitudes of balance wheels are substantially distributed in a certain range, it is sufficient to use an adjusting mechanism having an adusting angle for one pulse which is equal to the ratio of an out-beat to an offset angle with respect to the minimum acceptable amplitude of a blaance wheel. Although one embodiment of the present invention is shown in FIG. 6 in a form of a block diagram, it should be noted that modifications may be readily made such as by changing the signal transmission system.

According to the automatic out-beat adjusting device of the present invention, it is possible to rapidly and easily perform measurements and adjustments in a less expensive manner irrespective of the rate of a watch and the amplitude of a balanced wheel. An operator may simply put a watch on the device and take it off after it is adjusted. The operation may be performed simply by watching a lamp which indicates whether the watch is acceptable or not. Thus, no skill is required in performing the work and therefore one operator may handle a few machines.

What is claimed is:

1. Apparatus for measuring the out-beat of a watch, clock, or the like by measuring the difference between the duration of a first pulse interval of an impulse series produced by the watch, clock, or the like and a second pulse interval of said same impulse series comprising,
    a reversible digital counter,
    gating means at times responsive to said impulse series and at times to the attainment by said counter of a zero count for selectively producing a positive count gate pulse and a negative count gate pulse, and a single source of trigger pulses applied to said counter and occurring throughout the total durations of said first and second pulse intervals,
    said gating means producing said positive count gate pulse and controlling said counter to count said trigger pulses in a positive sense during said first pulse interval and producing said negative count gate pulse and controlling said counter to count said trigger pulses in a negative sense during said second pulse interval,
    said gating means further being responsive to the attainment by said counter of a zero count during said second pulse interval for again producing said positive count gate pulse and controlling said counter to count said trigger pulses in a positive sense over the remainder of said second pulse interval,
    whereby the count in said counter at the end of said second pulse interval corresponds to the difference in durations of said first and second pulse intervals irrespective of which is the longer.

2. An apparatus in accordnace with claim 1 in which means controlled by said counter adjust the out-beat of the watch by gradually moving an adjustable stud of the watch which has previously been displaced in a predetermined direction by a predetermined distance in a direction opposite to said predetermined direction in accordance with the result of the measurement of said counter.

* * * * *